United States Patent
Galvez et al.

(10) Patent No.: US 10,450,481 B2
(45) Date of Patent: Oct. 22, 2019

(54) INVISIBLE FINGERPRINT COATINGS AND PROCESS FOR FORMING SAME

(71) Applicant: NBD NANOTECHNOLOGIES, INC., Danvers, MA (US)

(72) Inventors: Miguel Galvez, Danvers, MA (US); Bong June Zhang, Chestnut Hill, MA (US); Esra Altinok, Medford, MA (US)

(73) Assignee: NBD NANOTECHNOLOGIES, INC., Lexington, MA (US)

( * ) Notice: Subject to any disclaimer, the term of this patent is extended or adjusted under 35 U.S.C. 154(b) by 0 days.

(21) Appl. No.: 15/614,841

(22) Filed: Jun. 6, 2017

(65) Prior Publication Data

US 2017/0349785 A1   Dec. 7, 2017

Related U.S. Application Data

(60) Provisional application No. 62/345,924, filed on Jun. 6, 2016.

(51) Int. Cl.
| | | |
|---|---|---|
| *C09D 183/04* | (2006.01) | |
| *B05D 3/04* | (2006.01) | |
| *B05D 3/10* | (2006.01) | |
| *C09D 5/16* | (2006.01) | |
| *C09D 5/00* | (2006.01) | |

(52) U.S. Cl.
CPC ......... *C09D 183/04* (2013.01); *B05D 3/0466* (2013.01); *B05D 3/105* (2013.01); *C09D 5/00* (2013.01); *C09D 5/1675* (2013.01)

(58) Field of Classification Search
None
See application file for complete search history.

(56) References Cited

U.S. PATENT DOCUMENTS

| | | | | |
|---|---|---|---|---|
| 3,493,424 A | * | 2/1970 | Yates | C07F 7/0874 427/170 |
| 8,541,532 B2 | * | 9/2013 | Sugioka | C07F 7/21 528/27 |
| 2008/0221263 A1 | * | 9/2008 | Kanagasabapathy | C09D 5/1618 524/588 |

(Continued)

FOREIGN PATENT DOCUMENTS

| | | |
|---|---|---|
| WO | 2007052260 A2 | 5/2007 |
| WO | 2008153687 A2 | 12/2008 |

(Continued)

OTHER PUBLICATIONS

O'Lenick, Comparatively Speaking: Oleophilic vs. Siliphilic, downloaded from http://www.cosmeticsandtoiletries.com/research/chemistry/4823346.html, Oct. 13, 2008.

(Continued)

*Primary Examiner* — Melvin C. Mayes
*Assistant Examiner* — Colette B Nguyen
(74) *Attorney, Agent, or Firm* — Barnes & Thornburg LLP; Jason Bernstein (57) ABSTRACT

A process for forming a fingerprint-resistant coating on a substrate comprising activating the substrate by exposure to a plasma, and then depositing on the activated substrate at least one alkyl backbone monolayer, and hydroxyl-polyhedral oligomeric silsesquioxane (OH—POSS) nanoparticles.

17 Claims, 3 Drawing Sheets

(56) References Cited

U.S. PATENT DOCUMENTS

2012/0164458 A1* 6/2012 Biteau .................. G02B 1/105
                                                          428/447
2012/0174823 A1    7/2012 Ham et al.
2013/0178568 A1* 7/2013 Meuler ................ C09D 5/1625
                                                          524/269
2014/0370306 A1   12/2014 Park et al.

FOREIGN PATENT DOCUMENTS

| WO | 2014003827 A1 | 1/2014 |
| WO | 2016187569 A1 | 11/2016 |

OTHER PUBLICATIONS

Search Report for European Patent Application No. 17174597.9; dated Oct. 11, 2017.
Search Report for European Patent Application No. 17175236.3; dated Oct. 11, 2017.

* cited by examiner

INVISIBLE FINGERPRINT COATINGS AND PROCESS FOR FORMING SAME

CROSS-REFERENCE TO RELATED APPLICATION

This application claims benefit of U.S. provisional patent application No. 62/345,924, filed Jun. 6, 2016, entitled INVISIBLE FINGERPRINT COATINGS AND PROCESS FOR FORMING SAME, and commonly assigned to the assignee of the present application, the disclosure of which is incorporated by reference in its entirety herein

FIELD

The present disclosure relates, in exemplary embodiments, to coating compositions for coating a substrate to render fingerprints invisible or nearly invisible.

BACKGROUND

A person naturally produces sebum (from the sebaceous gland) and other oils from the face and fingertips. A person deposits such oils on cell phone (or other article) display screens, such as glass (or a screen protector, typically a polymeric plastic), glass ceramic, metal oxide, Plexiglas or the like materials or surfaces. Often. Such oils are visible and can reduce the quality of the images seen on the device, as well as contribute (with dirt, dust, etc.) to a reduced aesthetic appearance of the screen. Invisible fingerprint ("IFP") coatings are generally oleophilic coatings that cause oils to be invisible, or nearly invisible, by causing the oils, e.g., from fingerprints, to spread along the screen surface. The oils will match the index of refraction of the screen material, e.g., glass, so that light passes through making it appear that there are no fingerprints. The fingerprints are still present, one just cannot see them (at least not without scrutinizing the surface). Coatings and coating materials displaying IFP properties need to be hydrophobic enough that the oils bead up and evaporate. If the coating is too hydrophilic, then one can see the fingerprint. Also, if the coating is too hydrophobic (e.g., contact angles greater than about 85 degrees), it does not exhibit adequate properties.

In contrast, "anti-fingerprint" ("AFP") coatings are oleophobic coatings that resist wetting and can make fingerprints which do form more easily cleaned, but do not prevent formation of fingerprints or reduce the conspicuousness of fingerprints that do form. IFP coatings function in a different manner than AFP coatings.

It would be desirable to have a coating that can provide optically transparency, mechanically durability, and invisible fingerprint properties.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

The present disclosure relates, in exemplary embodiments to compositions for providing IFP coating. The present disclosure also relates to processes for forming a hydrophobic and oleophilic coating on a substrate, such as, but not limited to, a substrate made of a glass material, a ceramic or metal oxide surface.

In one exemplary embodiment, disclosed is a process for forming a fingerprint-resistant coating on a substrate, comprising (a) activating the substrate by exposing the substrate to a plasma of at least one gas selected from the group consisting of inert gases, $N_2$, $O_2$, and a mixture of at least two of the foregoing gases; and (b) a second deposition step, in which a hydrophobic coating comprising at least one alkyl backbone monolayer, preferably alkylsilane (AS), and hydroxyl-polyhedral oligomeric silsesquioxane (PH—POSS) nanoparticles are deposited on the first layer.

In another exemplary embodiment, disclosed is an invisible fingerprint coating, comprising: alkylsilane (AS) and PH—POSS prepared in either a protic or aprotic solvent and also comprising either an aqueous base or an aqueous acid.

In another exemplary embodiment, disclosed is a substrate obtained by the process described hereinabove, comprising a coating on a primer first layer, wherein the omniphobic coating comprises a mixture of hydrophobic alkyl monolayers, such as AS, and hydrophilic OH—POSS in either an aqueous acid or an aqueous base.

In another exemplary embodiment, disclosed is a composition for providing an invisible fingerprint coating, comprising a hydroxylated POSS material having a water contact angle in a range of 75-85 degrees and a diiodomethane contact angle in a range of 30-40 degrees.

In another exemplary embodiment, disclosed is an invisible fingerprint coating material, comprising at least one alkyl silane material, and a hydroxylated POSS material having a water contact angle in a range of 75-85 degrees and a diiodomethane contact angle in a range of 30-40 degrees.

Other features will become apparent upon reading the following detailed description of certain exemplary embodiments, when taken in conjunction with the appended claims.

BRIEF DESCRIPTION OF THE DRAWINGS

The drawings disclose exemplary embodiments or test results in which.

DETAILED DESCRIPTION

In exemplary embodiments, the substrate may be glass screens, for example as used in electronic displays, such as, but not limited to, cell phone screens, computer monitors, television screens, touch screens, appliances, heads-up displays, glasses (e.g., eyeglasses and sunglasses), masks (e.g., welding masks), interior wall paints, and the like. In exemplary embodiments, the substrate may also be used in appliance equipment and cosmetic finishes fields, for example decorative panels for appliances such as domestic electrical equipment (refrigerator doors, oven doors, display cases, etc.). The substrate may be made of glass (or a screen protector, typically a polymeric plastic), glass ceramic, metal oxide, Plexiglas or other material.

It is to be understood that in the present disclosure, the term "invisible" means invisible, nearly invisible or inconspicuous (e.g., not visible unless the surface is scrutinized). It is to be understood that "invisibility" also depends, to an extent, on the refraction of the light and on the way one views the surface. from some angles a fingerprint may be invisible, while at other angles it may be discernable. The term "wettability" means the property whereby polar or non-polar liquids adhere to a substrate, forming an undesirable film, and also the tendency of a substrate to retain dust or dirt of all kinds, fingerprints, insects, etc.

The presence of liquids, often laden with oil, is critical in electronic display particularly for reducing the visibility of fingerprints on the surface. The wetting properties of a substrate can be categorized into hydro/oleophobic and hydro/oleophilic. A hydrophobic/oleophobic substrate means an oil (including organic liquids) and water repellent substrate. Usually, the contact angle of omniphobic surface is higher than about 60 degrees for hexadecane and about 90 degrees in the case of water in case of flat surface. Hydrophilic/oleophilic substrates mean oil and water are attracted to the surface. As such, the liquid will easily spread across the surface and have a low contact angle (less than about 50 degrees).

In order to achieve an invisible fingerprint coating, the contact angle of water and oil must be optimized such that the resulting liquids spread across the surface and the liquid on the surfaces matches the index of refraction from the glass substrate. In such cases, the light will pass through the fingerprint and make the visible effect of an invisible fingerprint. In order to achieve this contact angle, it was demonstrated that surfaces with hydrophobic properties and oleophilic properties were desired. In order to optimize the effect it was found that that the water contact angle must be in the range of about 70-85 degrees and the diiodomethane contact angle must be in the range of about 25-40 degrees.

A feature of a composition as disclosed herein is the use of a hydrophobic SAM alkyl silane and PH—POSS. The SAM alkyl silane provides hydrophobicity, but by itself has a water contact angle of about 110 degrees and is too hydrophobic. Therefore, to reduce both the water and diiodomethane contact angles, an additive is needed; however, the additive must provide the wettability and IFP properties when incorporated into the coating, and also be able to form a coating with the alkyl silane. Accordingly, existing additives were unlikely to be adequate. In exemplary embodiments disclosed herein, PH—POSS is used as an additive because it is hydrophilic.

There are several benefits of incorporating an invisible fingerprint coating as described herein on a substrate, such as a glass substrate. Such a coating allows the water droplets to slide off vertical or inclined surfaces and still be easily cleaned. The oleophilic surface of such coating will allow the fingerprint oils to spread across the surface and result in a liquid film instead of beaded up oil. The combination of hydrophobicity and oleophilicity tuned, in exemplary embodiments, to a specific contact angle of 80 degrees with water and less than 40 degrees with diiodomethane can maximize the optical transparency or invisibility of fingerprint. Such coatings can demonstrate self-healing properties due to free-floating hydrophilic additives based in a hydrophobic coating, thereby reducing degradation over time.

Agents known for imparting invisible fingerprint properties that can be used in the form of a coating layer on glazing (substrate) include, but are not limited to, alkylsilanes (AS) and hydroxyl terminated T8 POSS nanoparticles in acidic or alkaline solution. As described herein, a coating layer may be obtained by applying a solution containing an AS material and hydroxyl-POSS in an aqueous or nonaqueous acidic or basic solvent to the surface of a substrate.

Well-known alkylsilane (referred to as "AS", but not all of the examples herein are silane derivatives) agents are, for example, alkyl silanes, alkyl thiols, alkyl phosphonates, and alkyl carboxylic acids, the alkyl group of which has at least one alkyl end group, i.e., one consisting of an $H_3C$—$(CH2)_n$— group, in which n is zero or a positive integer.

"Self-healing" materials are those that have the ability to repair damage caused by mechanical use over time. Hydroxyl T8-POSS is a nanoparticle-based structure whose end terminals are hydrophilic and oleophilic that lower the repellency of the alkyl silane. Nanoparticles formed by the exemplary methods disclosed herein can be distributed in a generally uniform manner in the polymer matrix (for example, an alkyl SAM). These nanoparticles will float to the surface of the polymer matrix when damaged and demonstrate self-healing abilities.

One of the more significant problems with optically transparent substrates and coatings is mechanical abrasion, which degrades, wears away or diminishes the coating thickness, transparency or effectiveness. Abrasion occurs to a greater or lesser extent during substrate handling by the user, such as by rubbing with a cloth to remove fingerprints and dirt, which is periodically necessary in particular for restoring satisfactory visibility through a transparent substrate. Degradation may also result from exposure to ultraviolet radiation, heat, cold, chemical, salt or other corrosive material, dirt, other abrasive material, or other environmental elements, conditions or materials.

Such self-healing and abrasion resistance performance typically makes it possible for the substrates to meet the specifications imposed at the present time by the electronic industry more effectively, both in terms of abrasion resistance, UV resistance, and salt corrosion resistance.

In exemplary embodiments, suitable coatings may have a water contact angle between 75 and 85 degrees. In exemplary embodiments, suitable coatings may have a diiodomethane contact angle between 30 and 40 degrees.

According to one exemplary embodiment, a process is disclosed for providing a coating on a substrate, such as one formed of a glass material, a ceramic or a metal oxide, the process comprising the following steps.

First, a substrate is activated by exposure of the substrate surface to a plasma of a gas selected from the inert gases of the Ar or He type, the gases N2, O2, or $H_2O$, or a mixture of two or more of the foregoing. According to one exemplary embodiment, this activation step is carried out by exposing the substrate to a plasma of a gas mixture containing $H_2O$. The activation step increases the hydroxyl density on the surface of the substrate, thereby increasing the bonding density of the SAM.

Second, a hydrophobic coating comprising at least one alkyl monolayer and a T8 hydroxyl polyhedral oligomeric silsesquioxane (Hydroxyl-POSS) is formed. In exemplary embodiments, the alkyl monolayer is either an alkylsilane (AS) or alkylthiol (AT). This is then mixed with a protic or an aprotic solvent containing either an aqueous base or acid.

Third, this hydrophobic coating is deposited on the substrate.

Fourth, an oleophobic coating consisting of an alkyl monolayer and Hydroxy-POSS is prepared in either a protic or an aprotic solvent containing either an aqueous base or acid.

Typically, the coating layer is deposited by dip, spray, and thermal CVD (chemical vapor deposition) under conditions enabling a RMS (root mean square) surface roughness of between 5 and 100 nm to be obtained. In exemplary embodiments, a RMS (root mean square) surface roughness of between 5 and 10 nm can be obtained.

Glazed substrates thus obtained are optically transparent, resistant to mechanical abrasion and other mechanical impact affects, and is self-healing. For the purposes of the present disclosure, "optically transparent" means optically neutral to the substrate (for example, glass), i.e., the transmission or haze of pre-treated glass is not materially changed.

According to one exemplary method, the step of depositing the coating is carried out using a solution obtained from a mixture of an either alkylsilane (AS) of formula, hydroxyl terminated T8 polyhedral oligomeric silsesquioxane, and either an aqueous acid or an aqueous base:

$$H_3C-(CH_2)_n-Si(X)_{3-p}(R)_p$$

in which:
in one exemplary embodiment, n=0 to 15; yet in another exemplary embodiment, n=3 to 5;
in one exemplary embodiment, p=0, or 2; yet in another exemplary embodiment, p=0 or 1; yet in another exemplary embodiment, p=0;
R is an alkyl group or a hydrogen atom; and,
X is a hydrolysable group, such as, but not limited to, a halide group or an alkoxy group.

In which,
R is OH— $(CH_2)_n$ and
in one exemplary embodiment, n=0 to 5, yet in another exemplary embodiment, n=1.

A feature of exemplary embodiments of the presently disclosed composition is the balancing of the relative amounts of SAM and the PH—POSS. A traditional SAM will provide materials that are too hydrophobic and oleophobic to serve adequately as an invisible fingerprint coating. Pure glass is hydrophilic and oleophobic (WCA at about 30 degrees, and diiodomethane at about 40-45 degrees). Regarding the substitution on the POSS structure, generally, the more hydroxylation there is, the more hydrophilic the structure will be. It is important to have the right level of hydroxylation to avoid too high or too low a WCA, which would result in inadequate properties to provide invisible fingerprint functionality. Too much PH—POSS and the material becomes hydrophilic and does not demonstrate the desired properties. Too little PH—POSS results in the material being too hydrophobic/oleophobic to work. As such, the wettability needs to be tuned with respect to the particular PH—POSS composition and the intended use (e.g., substrate) to adequately provide invisible fingerprint properties. Coated surfaces having a water contact angle in a range of 75-85 degrees and a diiodomethane contact angle in a range of 30-40 degrees demonstrated excellent invisibility properties.

In alternative exemplary embodiments, other non-fluorinated hydrophobic materials instead of PH—POSS may be used. It is also possible that other hydrophilic POSS materials may be used, such as, but not limited to, PEGylated-POSS, amine-substituted POSS, carboxylic acid-substituted POSS, and the like.

In another exemplary embodiment, a coating made according to the methods disclosed herein had a water contact angle of 80 degrees and a diiodomethane contact angle of 30 degrees and displayed excellent invisible fingerprint properties.

The present disclosure also relates to an omniphobic coating comprising or formed by a substrate as described herein, this coating being in particular used as glazing for various vehicle surfaces or for buildings.

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

EXAMPLES

The following examples are set forth for purposes of illustration only. Parts and percentages appearing in such examples are by weight unless otherwise stipulated.

Example 1

PH—POSS Synthesis 5 mL of triethoxysilylmethanol solution (50% in EtOH) was placed in a 20 mL scintillation vial containing 2 mL of 0.1M aqueous KOH solution. The reaction mixture was left overnight stirring at room temperature. Upon completion of reaction, evaporation of the solvent slowly resulted in solid/gel product, which then turned into solid in couple weeks. Yield: 850 mg (79%).

Aqueous acid or base is required to assist nucleophilic reaction of AS. In exemplary embodiments, the acid may have a pH in the range of 1-3. In exemplary embodiments, the acid may be a composition, such as, but not limited to, ascorbic acid, citric acid, salicylic acid, acetic acid, hydrochloric acid, oxalic acid, phosphoric acid, sulfuric acid, or the like. In exemplary embodiments, the base may have a pH in the range of 11-14. In exemplary embodiments, the base may be a composition, such as, but not limited to, ammonium hydroxide, sodium bicarbonate, sodium carbonate, sodium hydroxide, potassium hydroxide, or the like. A low pH acid or high pH base as described hereinabove is used because a deprotonation of the OH occurs on the substrate (e.g., glass) surface to become O—, which is more reactive as a nucleophile than OH, thereby increasing the bonding density of the SAM, which has the leaving group.

In another exemplary embodiment the structure of the PH—POSS is:

where R is $(CH_2)_nOH$

Example 2

(OH)2-POSS Synthesis

2.45 g of bis(2-hydroxyethyl)-3-aminopropyl triethoxysilane (MW=309.47 g/mol, 7.91 mmol) was discharged in EtOH:octane=10:1 (15 ml) to a 25 ml vial.

A catalytic amount of 0.4M KOH was added to the mixture. The reaction mixture was stirred overnight at room temperature. The mixture was then dried at reduced pressure. After evaporation of the final product, 1.05 g of oil was obtained.

The composition is $(HOCH_2CH_2)_2N—(CH_2)_nSi(X)_{3-p}R_p$, in which:

- in one exemplary embodiment, n=0 to 15; yet in another exemplary embodiment, n=3 to 5;
- in one exemplary embodiment, p=0, 1 or 2; in another exemplary embodiment, p=0 or 1; yet in another exemplary embodiment, p=0;
- R is an alkyl group or a hydrogen atom; and
- X is a hydrolysable group, such as, but not limited to, a halide group or an alkoxy group.

The PH—POSS is shown as:

in which:
R is $CH_2OH(CHOH)_n$ and
in one exemplary embodiment, n=1 to 10; in another exemplary embodiment, n=0 to 5; and in yet another exemplary embodiment, n=3.

Example 3

$CH_2OH(CHOH)_m$—POSS Synthesis 5.0 g of N-(3-triethoxysilylpropyl)gluconamide solution (50% in EtOH) was placed in a 20 mL scintillation vial containing 10 mL of EtOH. Then, 2 mL of 0.1M aqueous KOH solution was added to the vial. The reaction mixture was left overnight stirring at room temperature. The precipitated formed was collected via vacuum filtration. The yield was 750 mg (42%).

Example 4

Certain Exemplary Embodiments and Aspects Thereof are Described Below in Greater Detail

Example 4A

Activating Plasma Conditions

According to exemplary embodiments, the substrate was treated by an activated gas in the form of a plasma. This step may be carried out in various vacuum or atmospheric-pressure chambers. For example, it is possible to use a parallel-plate RF reactor. The treatment results in a chemical modification of the substrate, but no physical alteration such as morphology. The gas used is selected from Ar, He, $N_2$, or $O_2$ or a mixture of two or more of these gases. The working pressure was regulated between 50 and 500 mTorr, the power between 10 and 200 W, and the activation time was between about 1 minute and about 5 minutes, typically within 1 minute.

Example 4B

Invisible Fingerprint Layer Deposition Conditions

According to exemplary embodiments, the invisible fingerprint layer comprising an AS, hydroxyl-POSS, and an aqueous base may be deposited by any appropriate deposition technique known to those skilled in the art, as described hereinabove.

The present disclosure also provides a glass, ceramic or metal oxide substrate provided with an invisible fingerprint coating that can be obtained by process according to one of the above exemplary embodiments, comprising:

- An AS material and a hydroxyl-POSS material in aqueous base or acid, i.e., essentially, or exclusively, consisting of an invisible fingerprint layer, the surface of which has a surface roughness of greater than 5 nm and has been activated by treatment with a plasma of a gas chosen from the noble gases of the Ar or He type, the gases $N_2$ or $O_2$, or by a plasma of a mixture of at least two of the foregoing gases, preferably under conditions not modifying or substantially not modifying the surface roughness; and
- AS and PH—POSS, comprising an invisible fingerprint coating is assisted by aqueous base or acid to be bound on the substrate.

In exemplary embodiments, the substrate is obtained by carrying out an activation step activated by means of a plasma of a gas mixture containing $H_2O$ and at least one gas selected from the group consisting of Ar, He and $N_2$.

In exemplary embodiments, the thickness of the invisible fingerprint layer is between 10 and 500 nm. In other exemplary embodiments, the thickness of the invisible fingerprint layer is between 20 and 100 nm.

In exemplary embodiments, the RMS roughness of the omniphobic layer is less than 10 nm. In other exemplary embodiments, the RMS roughness of the omniphobic layer is between 5 and 10 nm.

A feature of the coating materials disclosed in exemplary embodiments is the ability to form a coating on a surface and have a water contact angle between 75-85 degrees and a diiodomethane contact angle between 30-40.

Example 5

Preparation of Material and Coating the Substrate

Example 5A

Preparation of a Glass Substrate with Plasma Activation

A substrate of soda lime tempered glass was placed in a chamber of a low-pressure PECVD (plasma-enhanced chemical vapor deposition) reactor. A residual vacuum in the chamber of at least 5 mPa (5×10-5 mbar) was first created prior to the activating gas being introduced. The gas or gas mixture was introduced for the surface treatment of glass substrate into the chamber with flow rates at 100 sccm until the total pressure in the reactor was set at 350 mTorr.

At equilibrium, a plasma of the gas introduced was ignited by electrically biasing the gas diffuser with an average radiofrequency (13.56 MHz) power of 100 W for a time of about 1 minute at room temperature.

Example 5B

Invisible Fingerprint Coating Solution Application

An invisible fingerprint coating solution was prepared by the following manner (the percentages are by weight): a mixture of 20% ethanol, 70% water and 10% aqueous 5M $NH_4OH$ was prepared. A 5% proportion, relative to the aforementioned two constituents, of the compounds with the formula $C_8H_{18}(OEt)_3$, where Et=ethyl, and PH—POSS was added. The mixture was ultrasonicated for 30 minute. The omniphobic coating solution thus obtained was deposited on the plasma activated substrate by dipping. The specimen was dried in the oven at 75° C. for at least 2 hours.

Example 6

Testing and Analysis

For testing, the control was not surface treated, and the specimen was an invisible fingerprint coating on a glass specimen which was plasma-activated. The specimens prepared as described above were evaluated according to the following test methods.

The initial contact angle measurement was carried out with water and diiodomethane, which provide a reference indication of the omniphobicity of the grafted substrate.

The transmittance test was measured percentage of the irradiance of light according to ASTM D1003.

The abrasion resistance, obtained by measuring the residual contact angle of water on the specimen after the grafted coating was abraded according to ASTM D4060 on the specimens with an abrasive disk of CS10 hardness under a load of 250 g on an area measuring 1.5 $cm^2$, with a translational rate of 50 cycles/minute and a rotation speed of 6 rpm. A specimen is deemed to be satisfactory in the test if the contact angle remains greater than 80° after 1500 cycles.

The chemical resistance test was done in a strong acid (pH 2) and base (pH 11) environment at room temperature. A specimen is deemed to be satisfactory in the test if the water contact angle remains greater than 90 degrees after 8 hours.

Example 7

Contact Angle Measurement

The invisible fingerprint coating was estimated by contact angle measurement with different fluids such as water and diiodomethane. The results obtained for the specimens prepared in accordance with the procedure above are shown in Table 1 below.

TABLE 1

|  | 1 | 2 | 3 | 4 | 5 | Mean |
|---|---|---|---|---|---|---|
| Water | 81 | 80 | 78 | 82 | 77 | 80 |
| diiodomethane | 40 | 39 | 41 | 40 | 38 | 40 |

Table 2 below shows contact angle measurements on alkylsilane (AS) without PH—POSS coating.

TABLE 2

|  | 1 | 2 | 3 | 4 | 5 | Mean |
|---|---|---|---|---|---|---|
| Water | 115 | 108 | 113 | 110 | 104 | 110 |
| diiodomethane | 40 | 39 | 41 | 40 | 38 | 40 |

Example 8

Fingerprint Resistance and Invisibility

Figure 1A:
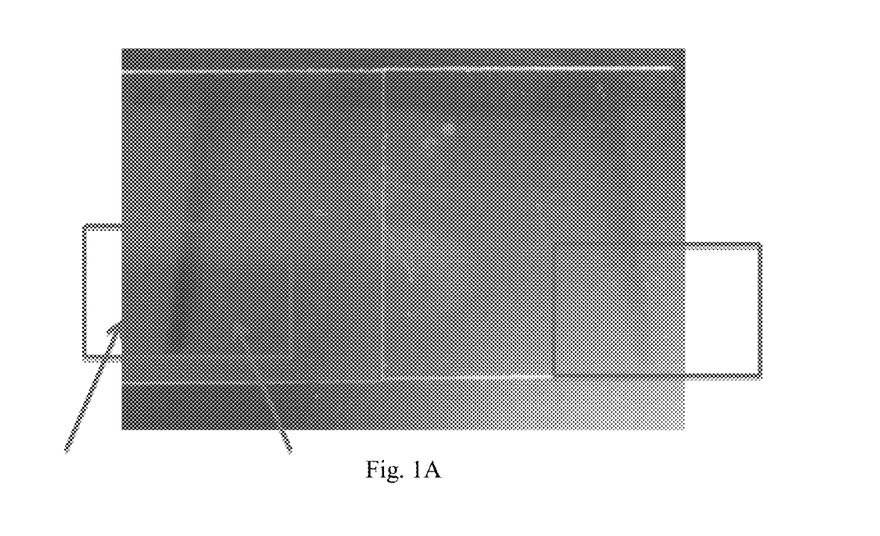
FIG. 1A is a photograph of a fingerprint placed between two pieces of Gorilla Tempered Glass showing two substrates: the substrate on the left is coated according to Example 1 and the substrate on the right is uncoated.
Figure 1B:
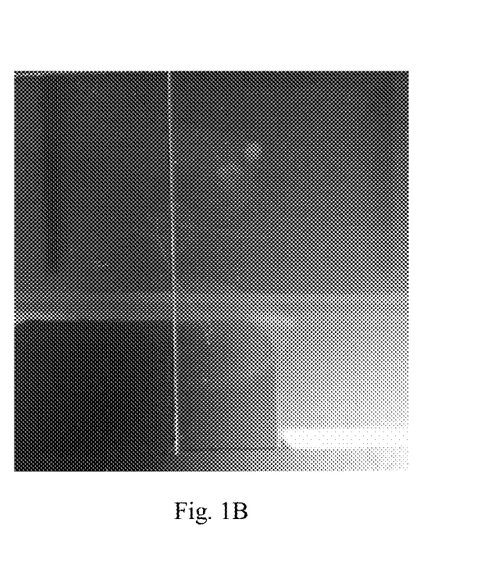
FIG. 1B is a detailed view of the photograph of FIG. 1A.

Fingerprint properties were measured by placing a fingerprint in between two substrates, coated (on left) and uncoated (on right) on each photo in FIGS. 1A and 1B of a fingerprint placed between two pieces of Gorilla Tempered Glass. The coated substrate on the left demonstrates no fingerprint while the uncoated on the right has a clear fingerprint smudge.

Figure 2:
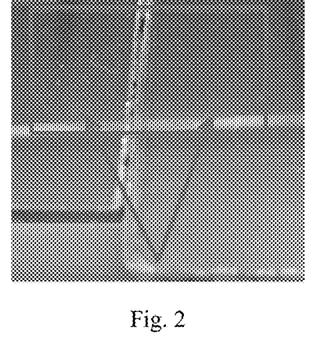
FIG. 2 is a photograph showing two substrates: the substrate on the left is coated with alkylsilane according to Example 5. The substrate on the right is coated with alkylsilane and OH—POSS nanoparticles.
Figure 3:
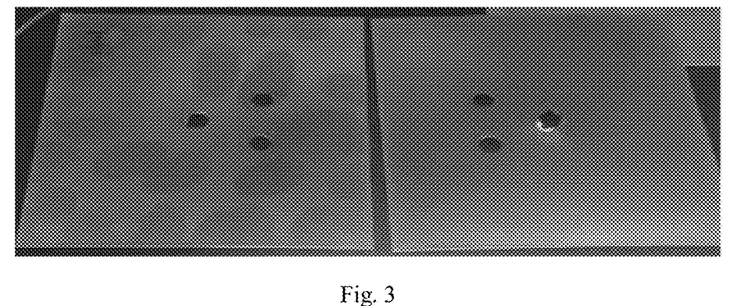
FIG. 3 is a photograph showing a sheet of metal uncoated (left) and coated (right).
Figure 4:
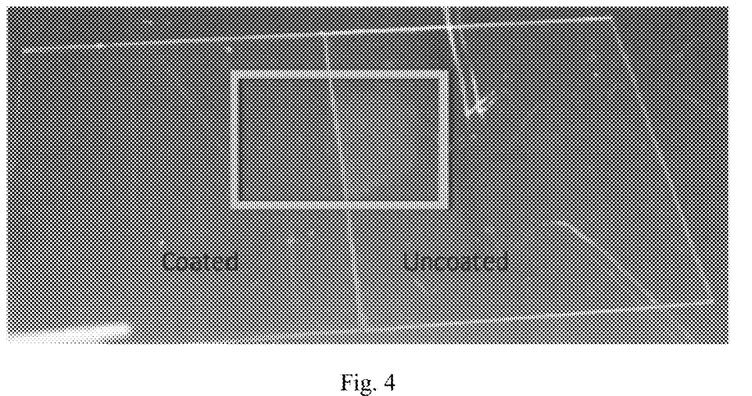
FIG. 4 is a photograph showing a sheet of glass coated (left) and uncoated (right), with the fingerprint located substantially within the rectangular marked area.

The purpose of this comparison was to test the efficacy of invisible fingerprints with a hydrophobic coating without a hydrophilic PH—POSS. As shown in the image in FIG. 2 the fingerprint is less visible on the invisible fingerprint coating (right) than the alkyl silane coating without PH—POSS (left). FIG. 3 is a photograph showing a sheet of metal uncoated (left) and coated (right). FIG. 4 is a photograph showing a sheet of glass coated (left) and uncoated (right), with the fingerprint located substantially within the rectangular marked area.

Example 9

Chemical Resistance

Figure 5:
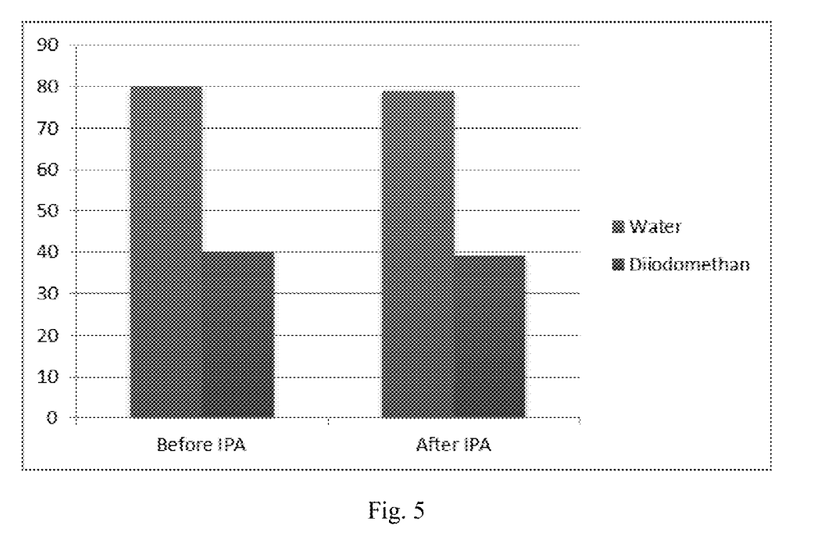
FIG. 5 is a chart showing chemical resistance of a substrate coated according to Example 1, before and after being rubbed with isopropyl alcohol.

In general, hydrophobic coating is vulnerable to hydrolysis and coating failure after exposure to harsh solvent conditions. The purpose of this test was to measure the chemical resistance properties of the substrates provided with an invisible fingerprint coating formed according to an exemplary method of the present disclosure. The test consisted of rubbing the sample with a cloth soaked in isopropanol alcohol (IPA) ten times. The test results, as seen in the chart of FIG. 5, a chemical resistance test before and after the IPA rub, showed that water contact angle and diiodomethane contact angle of the coatings were not affected by the solvent exposure.

Example 10

Abrasion Resistance

Figure 6:
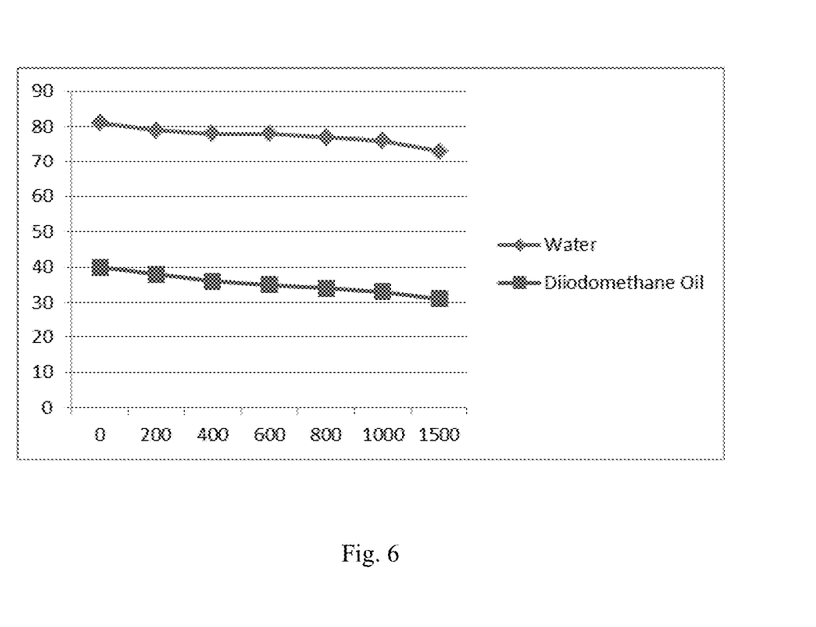
FIG. 6 is a graph showing mechanical abrasion test results of a substrate coated according to Example 5, with water and diiodomethane oil.

The abrasion resistance of the omniphobic substrates obtained was measured according to ASTM D4060. The test was carried out on the specimens with an abrasive disk of CS-10 hardness under a load of 250 g on an area measuring 1.5 $cm^2$, with a translational rate of 50 cycles/minute and a rotation speed of 6 rpm. A specimen was deemed to be satisfactory in the test if the contact angle remained greater than 70 degrees after 1500 cycles. It may be seen that the abrasion resistance properties of the specimen were sufficient and there was no marginal degradation of water contact angle, as shown in FIG. 6, which is a chart showing the results of a mechanical abrasion (ASTM D4060 Taber) test: 500 g weight load for 1,500 cycles (CS-10 wheel).

A 500 g weight was loaded to the abrasive disk of CS-10 hardness. The abrasion resistance of the specimen showed marginal degradation. Over 1,500 cycles, water contact angle stayed above the cutoff limit for water and diiodomethane (70 degrees and 30 degrees).

While the methods, equipment and systems have been described in connection with specific embodiments, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

As used in the specification and the appended claims, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where the event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, equipment and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

It should further be noted that any patents, applications and publications referred to herein are incorporated by reference in their entirety.

What is claimed is:

1. A process for forming a fingerprint-resistant coating on a substrate, comprising:
    a) activating the substrate by exposing the substrate to a plasma of at least one gas selected from the group consisting of inert gases, $N_2$, $O_2$, and a mixture of at least two of the foregoing gases; and
    b) depositing on the activated substrate of step a) a solution for a hydrophobic coating comprising an alkyl silane and a hydroxyl-terminated polyhedral oligomeric silsesquioxane (OH—POSS),
    wherein the coating has a water contact angle between 70 and 85 and a diiodomethane contact angle less than 40 degrees.

2. The process of claim 1, wherein the coating has a diiodomethane contact angle between 30 and 40 degrees.

3. The process of claim 1, wherein the solution for the hydrophobic coating in step b) comprises
    a) an alkyl silane (AS) of the formula $$H_3C-(CH_2)_n-Si(X)_{3-p}(R)_p \qquad \text{(Formula 1);}$$

wherein n is from 0 to 15,
    p is 0, 1, or 2,
    R is an alkyl group or a hydrogen atom,
    X is a hydrolysable group, or
    an alkylsilane (AS) of the formula $(EtO)_3Si(CH_2)_8Cl$;
    b) a hydroxyl terminated polyhedral oligomeric silsesquioxane (OH—POSS); and
    c) either at least one aqueous acid or at least one aqueous base.

4. The process of claim 3, wherein in Formula 1, n is between 3 and 5.

5. The process of claim 3, wherein in Formula 1, p is either 0 or 1.

6. The process of claim 3, wherein in Formula 1, p is 0.

7. The process of claim 3, wherein in Formula 1, X is selected from the group consisting of a halide group and an alkoxy group.

8. The process of claim 3, wherein the OH—POSS has the structure wherein R is —$(CH_2)_n$—OH, and
wherein n is an integer selected from a range of 1 to 5.

9. The process of claim 8, wherein n is 1.

10. The process of claim 3, the OH—POSS structure is wherein R is —$(CH_2)_3N(CH_2CH_2OH)_2$.

11. The process of claim 3, the OH—POSS structure is wherein R is —(CHOH)$_n$CH$_2$OH, where n is between 1 and 10.

12. The process of claim 1, wherein the depositing step b) is carried out with a solution comprising either an aqueous acid or an aqueous base to assist nucleophilic reaction of alkyl silane (AS), wherein the acid is at least one material selected from the group consisting of ascorbic acid, citric acid, salicylic acid, acetic acid, hydrochloric acid, oxalic acid, phosphoric acid, and sulfuric acid, and wherein the base at least one material selected from the group consisting of ammonium hydroxide, sodium bicarbonate, sodium carbonate, sodium hydroxide, and potassium hydroxide.

13. The process of claim 1, wherein the substrate is selected from the group consisting of glass, ceramic, and metal oxides.

14. A process for forming a fingerprint-resistant coating on a substrate, comprising:
depositing a solution for a hydrophobic coating comprising an alkyl silane and a hydroxyl-terminated polyhedral oligomeric silsesquioxane (OH—POSS) onto a surface of a substrate to form a coated substrate;
wherein the coated substrate has a water contact angle between 70 and 85 degrees and a diiodomethane contact angle between 30 and 40 degrees.

15. The process of claim 14, wherein the alkyl silane (AS) is of the formula (EtO)$_3$Si(CH$_2$)$_8$Cl.

16. The process of claim 15, wherein the process further comprises:
activating the surface of the substrate by exposing the surface of the substrate to a plasma of at least one gas selected from the group consisting of inert gases, N$_2$, O$_2$, and a mixture of at least two of the foregoing gases.

17. The process of claim 14, wherein the alkyl silane (AS) is of the formula 1:

$$H_3C-(CH_2)_n-Si(X)_{3-p}(R)_p \quad \text{(Formula 1)};$$

wherein n is from 0 to 15,
p is 0, 1, or 2,
R is an alkyl group or a hydrogen atom,
X is a hydrolysable group.

* * * * *